(12) United States Patent  
Lyu et al.

(10) Patent No.: US 11,080,136 B2  
(45) Date of Patent: Aug. 3, 2021

(54) DROPPED WRITE ERROR DETECTION

(71) Applicant: International Business Machines Corporation, Armonk, NY (US)

(72) Inventors: Gang Lyu, Shanghai (CN); Jun Gu, Shanghai (CN); Hong Zhou, Shanghai (CN)

(73) Assignee: International Business Machines Corporation, Armonk, NY (US)

( * ) Notice: Subject to any disclaimer, the term of this patent is extended or adjusted under 35 U.S.C. 154(b) by 26 days.

(21) Appl. No.: 16/734,449

(22) Filed: Jan. 6, 2020

(65) Prior Publication Data

US 2021/0208969 A1 Jul. 8, 2021

(51) Int. Cl.
*G06F 11/10* (2006.01)
*G06F 3/06* (2006.01)

(52) U.S. Cl.
CPC ........ *G06F 11/1076* (2013.01); *G06F 3/0619* (2013.01); *G06F 3/0644* (2013.01); *G06F 3/0659* (2013.01); *G06F 3/0673* (2013.01)

(58) Field of Classification Search
CPC .. G06F 11/1076; G06F 3/0619; G06F 3/0644; G06F 3/0659; G06F 3/0673
See application file for complete search history.

(56) References Cited

U.S. PATENT DOCUMENTS

| | | | |
|---|---|---|---|
| 7,549,089 B1 * | 6/2009 | Kimmel | G06F 11/1076 714/42 |
| 7,890,815 B2 | 2/2011 | Hafner | |
| 8,108,613 B2 | 1/2012 | Durica | |
| 8,140,909 B2 | 3/2012 | Luan | |
| 8,595,595 B1 * | 11/2013 | Grcanac | G06F 11/1088 714/770 |
| 8,667,326 B2 | 3/2014 | O'Connor | |
| 9,563,500 B2 | 2/2017 | Francis | |
| 2008/0091893 A1 | 4/2008 | Durica | |
| 2008/0282105 A1 * | 11/2008 | Deenadhayalan | G06F 11/1076 714/6.12 |
| 2009/0055584 A1 * | 2/2009 | Hafner | G06F 11/1076 711/114 |
| 2009/0055688 A1 * | 2/2009 | Hafner | G06F 11/004 714/42 |
| 2009/0216944 A1 | 8/2009 | Gill | |
| 2010/0251072 A1 | 9/2010 | Hafner | |

(Continued)

OTHER PUBLICATIONS

Hafner et al., "Undetected Disk Errors in Raid Arrays", IBM J. Res. & Dev., vol. 52, No. 4/5, Jul./Sep. 2008, 13 pages.

*Primary Examiner* — Kyle Vallecillo
(74) *Attorney, Agent, or Firm* — David B. Woycechowsky

(57) ABSTRACT

A computer-implemented method for dropped write error detection is proposed. In the method, a read request for a stride stored in an array of storage drives is received. The stride includes segments of a data and a first parity associated with the data spreading across the storage drives in the array of the storage drives. In response to the read request being a predefined sequential read request and a state of the stride being a first state, a parity check is performed on the stride. The first state indicates that no parity check has been performed after the data is written into the array of storage drives. The state of the stride is changed to a second state, and the second state is different with the first state.

18 Claims, 6 Drawing Sheets

(56) References Cited

U.S. PATENT DOCUMENTS

| | | | |
|---|---|---|---|
| 2011/0302446 A1* | 12/2011 | Becker-Szendy | ............................ G06F 11/1076 714/6.1 |
| 2012/0304025 A1* | 11/2012 | O'Connor | ........... G06F 11/1076 714/54 |
| 2020/0159621 A1* | 5/2020 | Velayuthaperumal | ....................... G06F 11/1435 |

* cited by examiner

DROPPED WRITE ERROR DETECTION

BACKGROUND

The present invention relates generally to data storage systems, and more specifically, to methods, systems and computer program products for detecting dropped write errors in a data storage system.

During the disk write process, there can be a failure of write command which is not detected by the storage controller. The write command is not actually written to a disk, but such failure is not detected by the disk itself, and the disk reports write completion to the storage controller. Such failure is called a disk dropped write error. Disk dropped write errors can be caused by many reasons, for example, a disk firmware bug, a mechanical failure, etc. Disk dropped write errors can happen against hard disk drives or solid state drives.

As the disk reports write success, the storage controller does not know there is a write failure and the data integrity has been broken. Disk dropped write error is a silent error to the host. When the data with a dropped write error is requested by a host read command, the incorrect and out-of-date data is returned to the host. The host or the storage may not even know the occurrence of the data integrity and data loss issue. Disk dropped write error is a difficult issue in the industry.

The Wikipedia entry for "data striping," as of 17 Sep. 2019, reads as follows: "In computer data storage, data striping is the technique of segmenting logically sequential data, such as a file, so that consecutive segments are stored on different physical storage devices. Striping is useful when a processing device requests data more quickly than a single storage device can provide it. By spreading segments across multiple devices which can be accessed concurrently, total data throughput is increased. It is also a useful method for balancing I/O load across an array of disks. Striping is used across disk drives in redundant array of independent disks (RAID) storage, network interface controllers, disk arrays, different computers in clustered file systems and grid-oriented storage, and RAM in some systems. The segments of sequential data written to or read from a disk before the operation continues on the next disk are usually called chunks, strides or stripe units, while their logical groups forming single striped operations are called strips or stripes. The amount of data in one chunk (stripe unit), often denominated in bytes, is variously referred to as the chunk size, stride size, stripe size, stripe depth or stripe length. The number of data disks in the array is sometimes called the stripe width, but it may also refer to the amount of data within a stripe. The amount of data in one stride multiplied by the number of data disks in the array (in other words, stripe depth times stripe width, which in the geometrical analogy would yield an area) is sometimes called the stripe size or stripe width."

SUMMARY

According to one embodiment of the present invention, there is provided a computer-implemented method for dropped write error detection. In the method, a read request for a stride stored in an array of storage drives is received. The stride includes segments of a data and a first parity associated with the data spreading across the storage drives in the array of the storage drives. In response to the read request being a predefined sequential read request and a state of the stride being a first state, a parity check is performed on the stride. The first state indicates that no parity check has been performed after the data is written into the array of storage drives. The state of the stride is changed to a second state, and the second state is different than the first state.

Other embodiments and aspects, including but not limited to, computer systems and computer program products, are described in detail herein and are considered a part of the claimed invention.

These and other features and advantages of the present invention will be described, or will become apparent to those of ordinary skill in the art in view of the following detailed description of the example embodiments of the present invention.

According to an aspect of the present invention, there is a method, computer program product and/or system that performs the following operations (not necessarily in the following order): (i) receiving, by one or more processing units, a read request for a stride stored in an array of storage drives, wherein the stride includes segments of a data and a first parity associated with the data spreading across the storage drives in the array of the storage drives; (ii) in response to the read request being a predefined sequential read request and a state of the stride being a first state, performing, by one or more processing units, a parity check on the stride, wherein the first state indicating that no parity check has been performed after the data is written into the array of storage drives; and (iii) changing, by one or more processing units, the state of the stride to a second state, the second state being different with the first state.

According to an aspect of the present invention, there is a method, computer program product and/or system, for use with a plurality of cooperatively operating storage devices that collectively store a plurality of strides of data, that performs the following operations (not necessarily in the following order): (i) writing a first stride of the plurality of strides to the plurality of cooperatively operating storage devices, with the first stride including substantive data and metadata including information indicating that no parity check has been performed since the substantive data was written to the plurality of cooperatively operating storage devices; (ii) receiving an access request to access the substantive data of the first stride; (iii) determining that the first stride has not been subject to a parity check since the first stride was written to the plurality of cooperatively operating storage devices based on the metadata of the first stride; and (iv) responsive to the access request and further responsive to the determination that the first stride has not been subject to a parity check: (a) performing a parity check on the first stride to determine that the first stride has been stored correctly, (b) responsive to the determination that the substantive data of the first right has been stored correctly and further responsive to the receipt of the access request, providing access to the substantive data of the first stride, and (c) changing the metadata of the first stride to indicate that a parity check has been performed on the first stride.

BRIEF DESCRIPTION OF THE DRAWINGS

Through the more detailed description of some embodiments of the present invention in the accompanying drawings, the above and other objects, features and advantages of the present invention will become more apparent, wherein the same reference generally refers to the same components in the embodiments of the present invention.

DETAILED DESCRIPTION

Figure 1:
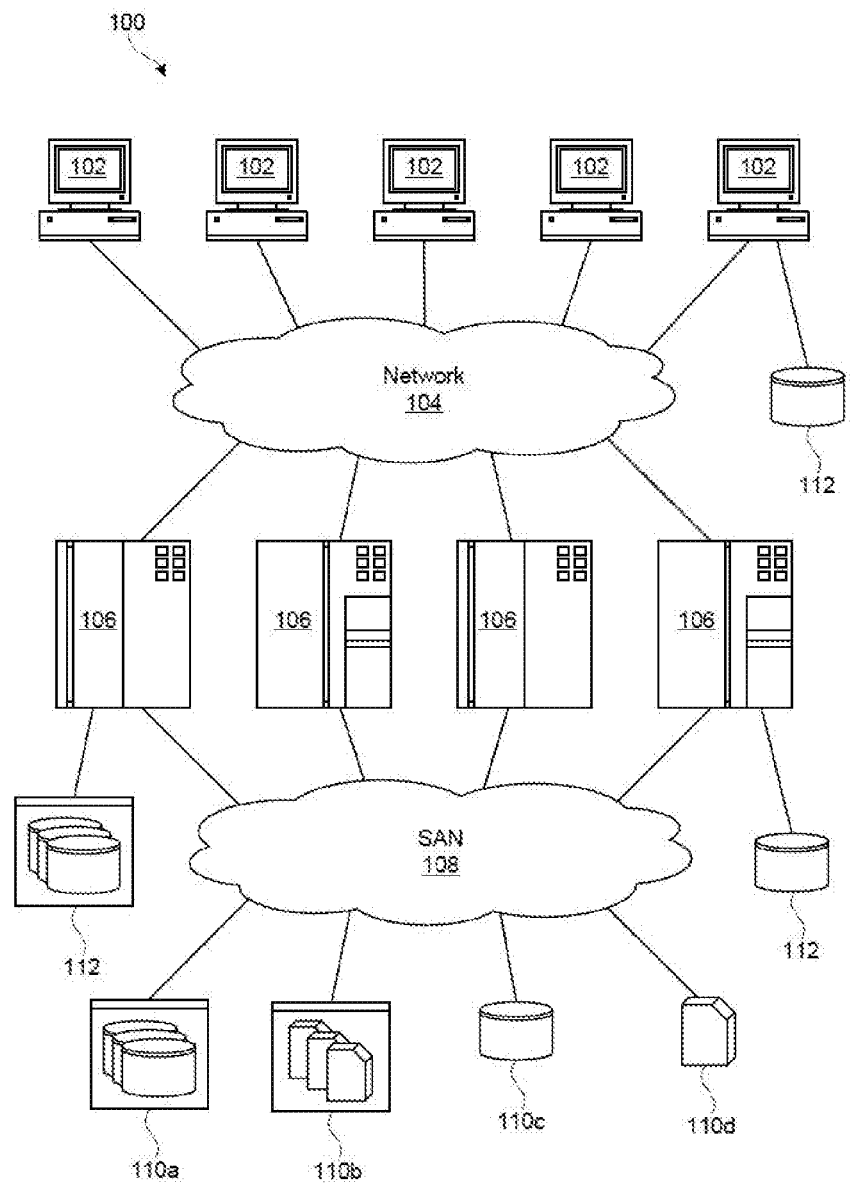
FIG. 1 is a high-level block diagram showing one example of a network architecture in which embodiments of the present invention might operate.

It will be readily understood that the components of the present invention, as generally described and illustrated in the Figures herein, could be arranged and designed in a wide variety of different configurations. Thus, the following more detailed description of the embodiments of the invention, as represented in the Figures, is not intended to limit the scope of the invention, as claimed, but is merely representative of certain examples of presently contemplated embodiments in accordance with the invention. The presently described embodiments will be best understood by reference to the drawings, wherein like parts are designated by like numerals throughout.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (for example, light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Referring to FIG. 1, one example of a network environment 100 is illustrated. The network environment 100 is presented to show one example of an environment where embodiments of the invention may operate. The network environment 100 is presented only by way of example and not limitation. Indeed, the systems and methods disclosed herein may be applicable to a wide variety of different network environments in addition to the network environment 100 shown.

As shown, the network environment 100 includes one or more computers 102, 106 interconnected by a network 104. The network 104 may include, for example, a local-area-network (LAN) 104, a wide-area-network (WAN) 104, the Internet 104, an intranet 104, or the like. In certain embodiments, the computers 102, 106 may include both client computers 102 and server computers 106 (also referred to herein as "hosts" 106 or "host systems" 106). In general, the client computers 102 initiate communication sessions, whereas the server computers 106 wait for and respond to requests from the client computers 102. In certain embodiments, the computers 102 and/or servers 106 may connect to one or more internal or external direct-attached storage systems 112 (for example, arrays of hard-disk drives, solid-state drives, tape drives, etc.). These computers 102, 106 and direct-attached storage systems 112 may communicate using protocols such as ATA (advanced technology attachment), SATA (serial advanced technology attachment), SCSI (small computer system interface), SAS (statistical analysis system), Fibre Channel, or the like.

The network environment 100 may, in certain embodiments, include a storage network 108 behind the servers 106, such as a storage-area-network (SAN) 108 or a LAN 108 (for example, when using network-attached storage). This network 108 may connect the servers 106 to one or more storage systems 110, such as arrays 110a of hard-disk drives or solid-state drives, tape libraries 110b, individual hard-disk drives 110c or solid-state drives 110c, tape drives 110d, CD-ROM libraries, or the like. To access a storage system 110, a host system 106 may communicate over physical connections from one or more ports on the host 106 to one or more ports on the storage system 110. A connection may be through a switch, fabric, direct connection, or the like. In certain embodiments, the servers 106 and storage systems 110 may communicate using a networking standard such as Fibre Channel (FC) or iSCSI (internet small computer system interface).

Figure 2:
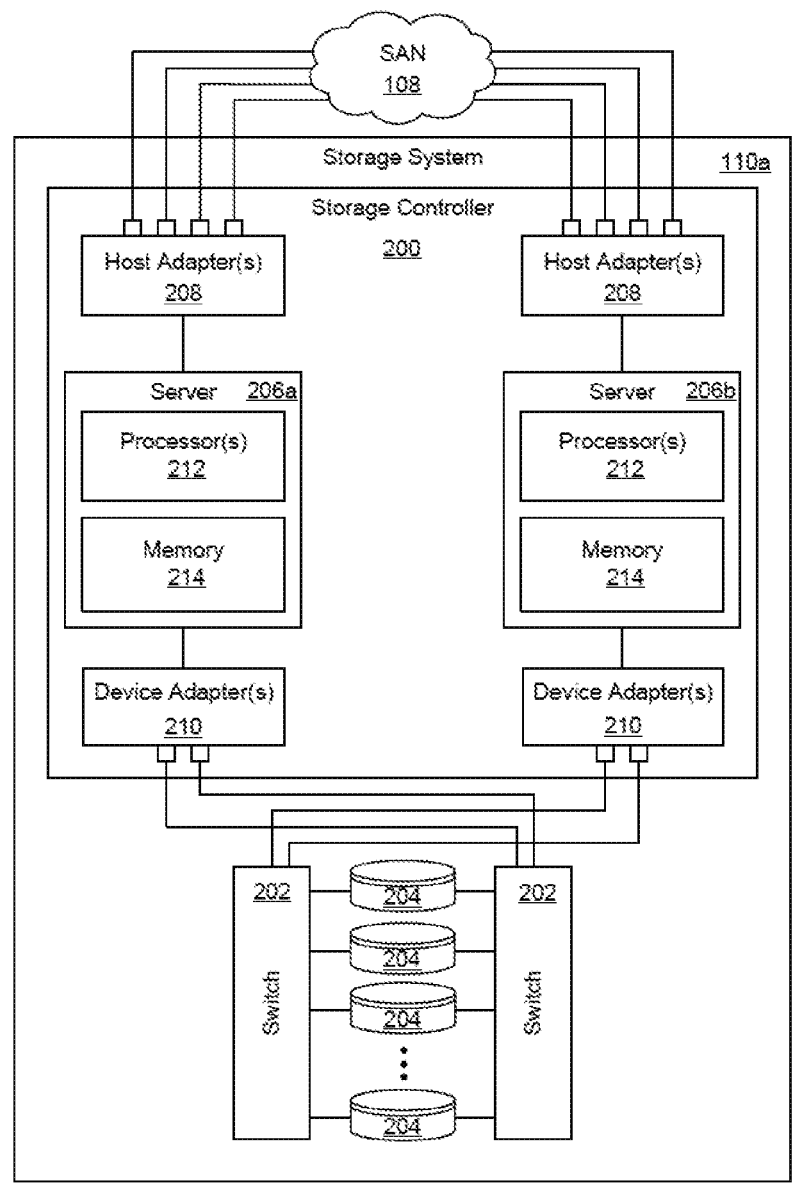
FIG. 2 is a high-level block diagram showing one example of a storage system in which embodiments of the present invention might operate.

Referring to FIG. 2, one embodiment of a storage system 110a containing an array of storage drives 204 (for example, hard-disk drives and/or solid-state drives) is illustrated. The internal components of the storage system 110a are shown since the systems and methods disclosed herein may, in certain embodiments, be implemented within such a storage system 110a, although the systems and methods may also be applicable to other storage systems. As shown, the storage system 110a includes a storage controller 200, one or more switches 202, and one or more storage drives 204 such as hard disk drives and/or solid-state drives (such as flash-memory-based drives). The storage controller 200 may enable one or more hosts 106 (for example, open system and/or mainframe servers 106) to access data in the one or more storage drives 204. In selected embodiments, the storage controller 200 includes one or more servers 206. The storage controller 200 may also include host adapters 208 and device adapters 210 to connect the storage controller 200 to host devices 106 and storage drives 204, respectively. During normal operation (when both servers 206 are operational), the servers 206 may manage I/O (input/output) to different logical subsystems (LSSs) within the enterprise storage system 110a. For example, in certain configurations, a first server 206a may handle I/O to even LSSs, while a second server 206b may handle I/O to odd LSSs. These servers 206a, 206b may provide redundancy to ensure that data is always available to connected hosts 106. Thus, when one server 206a fails, the other server 206b may pick up the I/O load of the failed server 206a to ensure that I/O is able to continue between the hosts 106 and the storage drives 204. This process may be referred to as a "failover."

In selected embodiments, each server 206 includes one or more processors 212 and memory 214. The memory 214 may include volatile memory (for example, RAM) as well as non-volatile memory (for example, ROM, EPROM, EEPROM (electrically erasable programmable read-only memory), flash memory, local disk drives, local solid state drives etc.). The volatile and non-volatile memory may, in certain embodiments, store software modules that run on the processor(s) 212 and are used to access data in the storage drives 204. These software modules may manage all read and write requests to logical volumes in the storage drives 204.

In selected embodiments, memory 214 includes a cache, such as a DRAM (dynamic random-access memory) cache. Whenever a host 106 (for example, an open system or mainframe server 106) performs a read operation, the server 206 that performs the read may fetch data from the storages drives 204 and save it in its cache in the event it is required again. If the data is requested again by a host 106, the server 206 may fetch the data from the cache instead of fetching it from the storage drives 204, saving both time and resources. Similarly, when a host 106 performs a write, the server 106 that receives the write request may store the write in its cache, and destage the write to the storage drives 204 at a later time. The term "destage" means to asynchronously write new or updated data from a cache or nonvolatile storage to the storage drives. And the term "stage" means read the data from the storage drives to the cache or nonvolatile storage. When a write is stored in cache, the write may also be stored in non-volatile storage (NVS) of the opposite server 206 so that the write can be recovered by the opposite server 206 in the event the first server 206 fails. In certain embodiments, the NVS is implemented as battery backed cache in the opposite server 206.

One example of a storage system 110a having an architecture similar to that illustrated in FIG. 2 is the IBM DS8000TM enterprise storage system. The DS8000TM is a high-performance, high-capacity storage controller providing disk and solid-state storage that is designed to support continuous operations. Nevertheless, the systems and methods disclosed herein are not limited to the IBM DS8000TM enterprise storage system, but may be implemented in any comparable or analogous storage system or group of storage systems, regardless of the manufacturer, product name, or components or component names associated with the system. Any storage system that could benefit from one or more embodiments of the present invention is deemed to fall within the scope of the invention. Thus, the IBM DS8000TM is presented only by way of example and is not intended to be limiting.

As mentioned earlier, a disk dropped write error is a difficult issue in the industry. Read-after-write may be used to detect such a failure. The selected data is read back after it's written to the disk, and compared to a copy saved, such as in a buffer or cache, in the storage controller 200. If the two do not match, it is likely that a dropped write error is presented. However, this method may consume lots of resources of the storage system and cause performance degradation. Another method for detecting a dropped write error is parity check. The parity may include one or more parity bits. A parity bit is a bit added to a string of binary code to ensure that the total number of 1-bits in the string is even or odd. Parity is used as the simplest form of error detecting code. To detect a dropped write error, the full stride of a selected data, including the original parity, is read from an array and a parity is regenerated from the data. The original parity read from the array is compared with the regenerated parity. If the two parities match, that is an indication that there is no dropped write error in the selected data. If, on the other hand, the two parities are not the same, it is likely that a dropped write error is presented and needs to be corrected. Since this parity check method may also consume lots of resources and cause the performance degradation, it would be beneficial to have an effective solution which may detect a dropped write error while reducing the performance impact to the system.

According to embodiments of the present invention, a solution for detecting dropped write errors is proposed, which makes use of sequential read jobs to stage the parity with the data to do a parity check. The sequential read jobs do full stride stage and the extra workload is only to read the parity with the data of the stride and do a parity check. The response time of the sequential read jobs is normally not as important as random read/write. When a cyclic parity scan arrives, the data which has been scanned in the sequential read jobs after the destage of the modified data, would not be scanned.

A method 300 for detecting dropped write errors, according to an embodiment of the present invention, will be described with reference to the flowcharts of FIG. 3. According to embodiments of the present invention, the method may be implemented by a storage controller 200. The storage controller 200 may manage storage drives (in other words, hard disk drives and/or solid state drives) and present them to one or more host devices 106 as logical units. The storage controller 200 is interconnected with one or more hosts 106, either directly or through a network, and receives requests from the host 106 to write data to and read data from an array of storage drives. The storage controller 200 provides a number of functions, any or all of which may be implemented in hardware, software, firmware or in any combination of which will be referred to herein as "modules".

Figure 3:
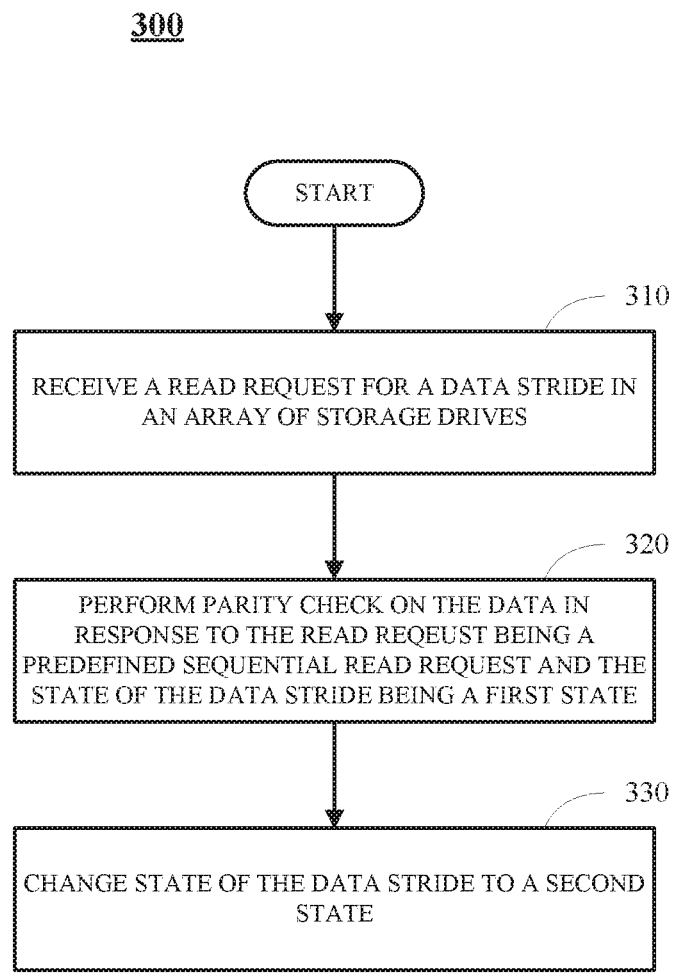
FIG. 3 is a process flow showing a method according to an embodiment of the present invention.

As shown in FIG. 3, at step 310, method 300 receives a read request for a stride stored in an array of storage drives. The stride includes segments of data and a first parity associated with the data spreading across the storage drives in the array of the storage drives. The array of the storage drives may be a Redundant Array of Independent Disks (RAID), which is a data storage virtualization technology that combines multiple physical disk drive components into one or more logical units for the purpose of data redundancy, performance improvement, or both. Please note that although the term "stride" is used herein to represent a group of segments of data and the parity with the data spreading across the storage drives, different terms may be used in different storage systems. For example, in some storage systems, the term "stripe" is used instead.

At step 320, in response to the read request being a predefined sequential read request and the state of the stride being a first state, a parity check on the stride is performed. According to an embodiment of the present invention, the first state may be a state indicating that no parity check has been performed after the data is written into the array of storage drives. According to embodiments of the present invention, some sequential read jobs may not require quick response time as a random read/write request, and the requests for such sequential read jobs may be set as the predefined sequential read request for dropped write error detection. Examples of such sequential read jobs include batch job, point-in-time copy background copy, initial copy of the remote copy, extent migration, etc.

At step 330, the state of the stride is changed to a second state and the second state is different than the first state.

According to an embodiment of the present invention, the state of the stride may be implemented by a bit corresponding to the stride in a bitmap for stride scan. For example, a bit is set as "1" for a stride when there is write destage on this stride. The term "destage" means to asynchronously write new or updated data from a cache or nonvolatile storage to a direct access storage device. After a parity check has been performed on the stride, the bit would be set as "0", indicating that a parity check has been performed after the write destage. Thus, the next time when a parity check on strides is due, a parity check may be performed only on the stride with bit "1" and be skipped for those with bit "0".

Figure 4:
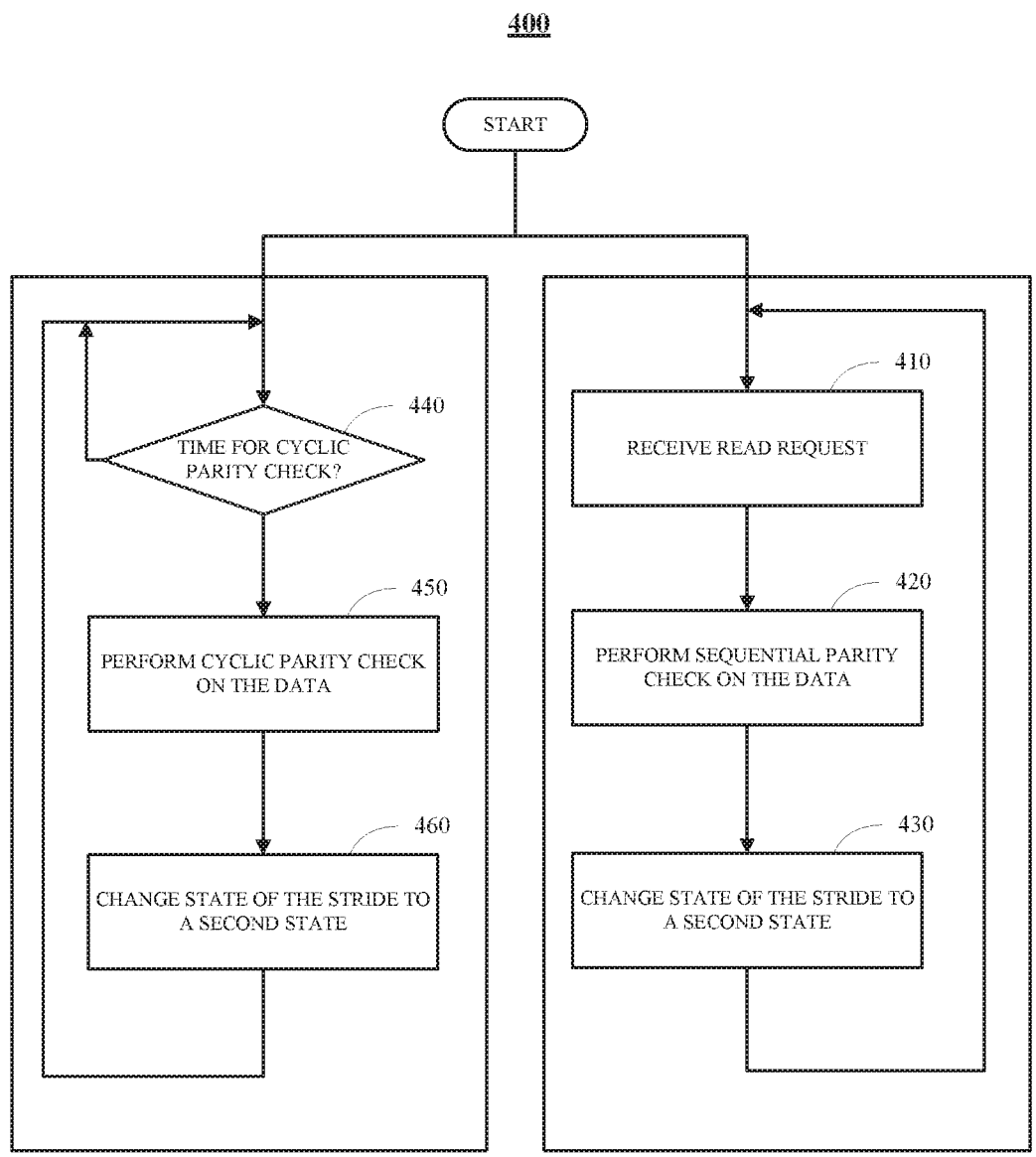
FIG. 4 is a process flow showing a method according to another embodiment of the present invention.

According to another embodiment of the present invention, besides the sequential parity check, a cyclic parity scan may be performed on the strides in the array of the storage drives. A method 400 for detecting dropped write errors according to another embodiment of the present invention will be described with reference to the flowcharts of FIG. 4. Steps 410, 420 and 430 as shown in FIG. 4 are similar to steps 310, 320, and 330 as shown in FIG. 3, which comprise a sequential parity scan operation, and the description to those steps here are omitted.

At step 440, it's determined whether it's time to perform a parity check on the stride according to a cyclic schedule associated with the stride.

At step 450, in response to determining that it's time to perform a parity check on the stride and the state of the stride being the first state, a parity check on the stride is performed.

At step 460, the state of the stride is changed to the second state.

The process then moves to the next stride and repeats the steps in 440 to 460. Steps 440, 450 and 460 comprise a cyclic parity check operation.

According to an embodiment of the present invention, the cyclic schedule associated with the stride may be based on a heat level of the stride. The heat level of the stride may be associated with an access frequency of the stride. Thus, the frequently accessed data would be checked more frequently.

As shown in the method illustrated in FIG. 4, the dropped write errors would be detected more efficiently.

According to an embodiment of the present invention, method 400 may further include a step of writing new data and a parity associated with the new data to the stride. In response to the writing, the state of the stride would be set to the first state. Thus, each time when there is a write destage operation, before a parity check is performed on the stride, the state of the stride would be the first state, indicating that a parity check has not been performed after a write destage.

Figure 5:
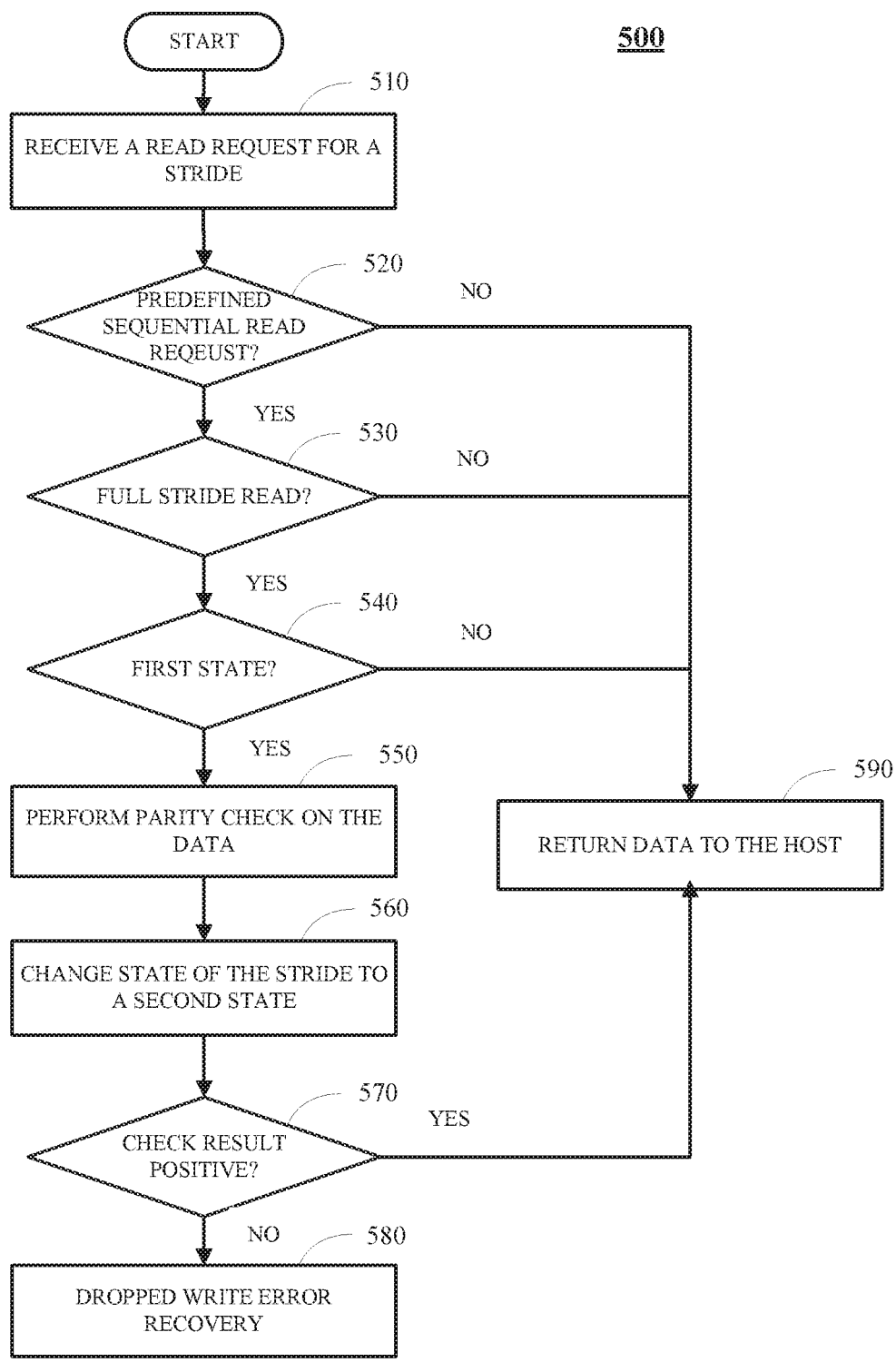
FIG. 5 is a process flow of a sequential parity scan operation according to an embodiment of the present invention.

Referring to FIG. 5, flowchart 500, a more detailed process of a sequential parity scan operation according to an embodiment of the present invention is described.

At step 510, a read request for a stride stored in an array of storage drives is received.

At step 520, it's determined whether the read request is a predefined sequential read request. The predefined sequential read request may be requests for some specific sequential read jobs defined in advance. According to embodiments of the present invention, some sequential read jobs may not require quick response time as a random read/write request, and the requests for such sequential read jobs may be predefined for dropped write error detection. Examples of such sequential read jobs include a batch job, a point-in-time copy background copy, an initial copy of the remote copy, an extent migration, etc.

If it's determined that the read request is a predefined sequential read request, for example, a request for a batch job, the process goes to step 530 to check whether it's a request for a full stride read, which would read data from the whole stride. If it's determined at step 530 that the read request is a full stride read request, the process goes to step 540. At step 540, it's determined whether the state of the stride is the first state. If yes, the process goes to step 550 to perform a parity check on the data in the stride.

As described earlier, to detect a dropped write error, the full stride of a data, including the original parity, is read from the array and a parity is regenerated from the data. The original parity read from the array is compared with the regenerated parity to check the integrity of the data in the stride. If the two parities match, that is an indication that there is no dropped write error in the selected data. If, on the other hand, the two parities are not the same, it is likely that a dropped write error is present and needs to be corrected.

At step 560, the state of the stride is changed to a second state, indicating that a parity check has been performed on the stride.

At step 570, it's determined whether the parity check result is positive. A positive check result means that the data in the stride is correctly written. A negative check result means that the data in the stride has errors. For a positive result, the process goes to step 590 to return the data to the host. For a negative result, the process goes to step 580 for dropped write error recovery operation.

Back to step 520, if it's determined that the read request is not a predefined sequential read request, the process goes to step 590, where the read request is performed as normal and the data is returned to the host. At step 530, if it's determined that the read request is not a full stride read, the process goes to step 590 to do a normal read operation and return the data to the host. At step 540, if it's determined that the state of the stride is not the first state, the process goes to step 590 to do a normal read operation and return the data to the host.

According to an embodiment of the present invention, for a performance-oriented system, which means that the system would like to get the read request processed timely, the step of performing a parity check and the step of returning data to the host may be performed asynchronously. At the same time, according to another embodiment of the present invention, for a data integrity-oriented system, which means that the data integrity is more important than the performance, the step of performing a parity check would be performed first, and then, after it's determined that the data in the stride is correct, the data would be returned to the host then, as shown by the process in FIG. 5.

Figure 6:
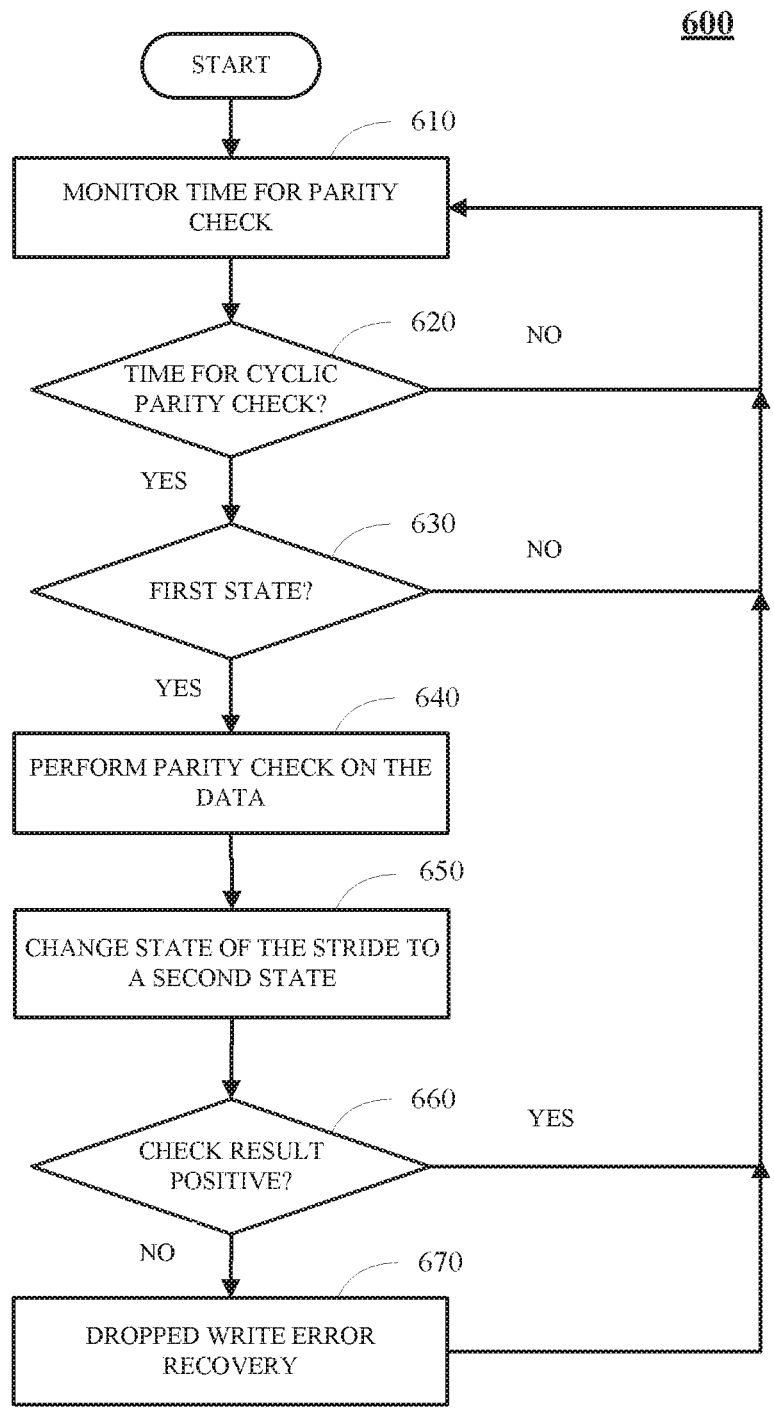
FIG. 6 is a process flow of a cyclic parity scan operation according to another embodiment of the present invention.

With reference to flowchart 600 in FIG. 6, a more detailed process of a cyclic parity scan operation, according to an embodiment of the present invention, is described.

At step 610, the time to perform a parity check on the stride is monitored according to a cyclic schedule associated with the stride. According to an embodiment of the present invention, the cyclic schedule associated with the stride may be based on a heat level of the stride. And the heat level of the stride may be associated with the access frequency, such as I/O frequency or read frequency or write frequency of the stride. A more frequently accessed stride would be assigned a higher heat level.

At step 620, it's determined whether it's time to perform the parity check. If no, the process goes back to step 610 to continue monitoring. If yes, the process goes to step 630 to determine whether the state of the stride is the first state. As described earlier, the state of the stride may be implemented by a bit corresponding to the stride in a bitmap for stride scan. A bit may be set as "1" as the first state before a parity check is performed on the stride.

If the stride is in the first state, the process goes to step 640 to perform the parity check on the stride. At step 650, the state of the stride is changed to a second state, for example, "0" for the bit.

At step 660, it's determined whether the check result is positive or negative. For a positive result, the process goes back to step 610 to continue monitoring. For a negative result, the process goes to step 670 for dropped write error recovery operation. Then the process goes back to step 610 to continue monitoring.

Back to step 630, if it's determined that the state of the stride is not the first state, which means that a parity check has been performed on the stride, the process goes back to step 610 to continue monitoring.

According to an embodiment of the present invention, the cyclic schedule may be implemented by a data structure which include a plurality of fields. Below a table is shown as an example of the data structure.

TABLE 1

Heat and Stride Address Table

| Heat Level | Parity Scan Cycle | Last Parity Scan Time | Next Parity Scan Time | Stride Address Pointer |
|---|---|---|---|---|
| Heat 00-Heat 10 | Time Interval 1 | Time 1 | Time 2 | Address 1 |
| Heat 11-Heat 20 | Time Interval 2 | Time 3 | Time 4 | Address 2 |

The Heat Level may be based on the I/O frequency of the stride. The Parity Scan Cycle corresponds to the heat level, and hotter data would have a higher scan frequency. The Last Parity Scan Time is a time for the scan on this heat level record in the last cycle. The Next Parity Scan Time is a time for the scan on this heat level record in this cycle. The Stride Address Pointer is a pointer to the strides in a stride list, where the data heat on those strides match the heat level in this record.

During the initialization process, the heat level and stride address list may be obtained from the tiering technology. The tiering technology is a well-known technology in storage area and the description would be omitted here for the purpose of conciseness. The parity scan cycle may be set based on the value of the heat level and the initial Last Parity Scan Time and Next Parity Scan Time are set as 0. When the first cycle starts, the Next Parity Scan Time would be set as the Parity Scan Cycle for all the records in the table. And when the parity scan cycle ends, the Last Parity Scan Time would be set as the previous Next Parity Scan Time, and the Next Parity Scan Time would be set as Last Parity Scan Time+the Parity Scan Cycle.

According to an embodiment of the present invention, the Heat Level may be updated dynamically according to the tier technology by resetting the Stride Address Pointer in the table above.

During the process of performing a parity check, it's possible that there is a new write destage operation performed to the storage drive at the same time. Thus, while the bit of the stride in the bitmap has been changed to a second state, for example "0" after the parity check, this state is no longer reflecting the current state of the stride, which should be "1" due to the new write destage operation. To prevent such conflict, according to an embodiment of the present invention, during the parity check operation, the stride scan bitmap may be locked to prevent the bits in the bitmap being changed by the write destage operation. After the parity check is performed and the state of the stride has been changed, the bitmap may be unlocked. For a write destage operation, if the stride scan bitmap is locked, the write destage operation would have to be held until the bitmap is unlocked.

According to embodiments of the present invention, different recovery methods for the dropped write error may be leveraged. For example, for a RAID 6 array, the data may be recovered from the dual parity in the RAID 6 array. Furthermore, if the data is still in cache, the data may be recovered from the cache. According to another embodiment of the present invention, if there is a sync remote mirror, the RAID array Logical Block Addresses (LBAs) may be translated to volume LBAs of the primary volumes, the corresponding data may be read from the secondary volumes, and then the stride may be overwritten with the data from the secondary volumes.

Please note that although methods and systems according to embodiments of the present invention are described in association with RAID array, the methods and systems according to embodiments of the present invention may be applied to other types of redundant storage configurations, such as erasure code. The systems and methods may also be applied to memory managers or storage virtualization products that provide RAID-like redundancy/performance on different types of storage media.

The above-described performance enhancement techniques may be used with RAIDs of various different RAID levels and are not limited to any particular RAID level.

Although the systems and methods disclosed herein have been discussed primarily in association with storage drives 204 configured in a RAID array, the systems and methods may be applied to other types of storage configurations. For example, solid state drives 204 may include a RAID or similar controller to stripe or mirror data across memory modules or chips within the drive 204. The systems and methods disclosed herein may be applied to solid state drives 204 to detect dropped write errors. The systems and methods may also be applied to memory managers or storage virtualization products that provide RAID-like redundancy/performance on different types of storage media. Furthermore, although the methods according to embodiments of the present invention are described as being implemented in a storage controller 200, the methods are not limited to be implemented in a storage controller 200, but may be implemented all or in part in a host system 106, at the RAID adapter level, within a storage drive 204, or the like.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising:
   receiving, by one or more processing units, a read request for a stride stored in an array of storage drives, wherein the stride includes segments of a data and a first parity associated with the data spreading across the storage drives in the array of the storage drives;
   in response to the read request being a predefined sequential read request and a state of the stride being a first state, performing, by one or more processing units, a parity check on the stride, wherein the first state indicating that no parity check has been performed after the data is written into the array of storage drives; and
   changing, by one or more processing units, the state of the stride to a second state, the second state being different with the first state.

2. The method of claim 1, further comprising:
   determining, by one or more processing units, whether it's time to perform a parity check on the stride according to a cyclic schedule associated with the stride;
   in response to determining that it's time to perform a parity check on the stride and the state of the stride being the first state, performing, by one or more processing units, a parity check on the stride; and
   changing, by one or more processing units, the state of the stride to the second state.

3. The method of claim 2, wherein the cyclic schedule associated with the stride is based on a heat level of the stride indicating an access frequency of the stride.

4. The method of claim 2, further comprising:
   in response to determining that it's time to perform a parity check on the stride and the state of the stride not being the first state, skipping, by one or more processing units, the parity check on the stride.

5. The method of claim 1, further comprising:
   writing, by one or more processing units, a second data and a second parity associated with the second data to the stride; and
   setting, by one or more processing units, the state of the stride to the first state.

6. The method of claim 1, wherein the parity check on the stride is performed by:
  reading the data and the first parity associated with the data from the stride;
  generating a second parity based on the data; and
  comparing the first parity with the second parity to check integrity of the data in the stride.

7. The method of claim 1, wherein the state of the stride is indicated by a bit corresponding to the stride in a stride scan bitmap, and wherein a first value of the bit indicates the first state and a second value of the bit indicates the second state.

8. The method of claim 1, further comprising:
  returning, by one or more processing units, the data in the stride to a host according to the read request,
  wherein the step of returning the data in the stride and the step of performing the parity check on the stride are performed asynchronously.

9. The method of claim 1, further comprising:
  in response to the result of the parity check on the stride being positive, returning, by one or more processing units, the data in the stride to a host according to the read request.

10. A computer program product (CPP) comprising a computer readable storage medium having program instructions embodied therewith, the program instructions being executable by a device to perform a method comprising:
  receiving a read request for a stride stored in an array of storage drives, wherein the stride includes segments of a data and a first parity associated with the data spreading across the storage drives in the array of the storage drives;
  in response to the read request being a predefined sequential read request and a state of the stride being a first state, performing a parity check on the stride, wherein the first state indicating that no parity check has been performed after the data is written into the array of storage drives; and
  changing the state of the stride to a second state, the second state being different with the first state.

11. The CPP of claim 10 further comprising a set of processor(s) for executing the program instructions, wherein the CPP is in the form of a computer system (CS).

12. The CPP of claim 10, the method further comprises:
  determining whether it's time to perform a parity check on the stride according to a cyclic schedule associated with the stride;
  in response to determining that it's time to perform a parity check on the stride and the state of the stride being the first state, performing a parity check on the stride; and
  changing the state of the stride to the second state.

13. The CPP of claim 12, wherein the cyclic schedule associated with the stride is based on a heat level of the stride indicating an access frequency of the stride.

14. The CPP of claim 10, wherein the state of the stride is indicated by a bit corresponding to the stride in a stride scan bitmap, and wherein a first value of the bit indicates the first state and a second value of the bit indicates the second state.

15. A computer implemented method (CIM) for use with a plurality of cooperatively operating storage devices that collectively store a plurality of strides of data, the CIM comprising:
  writing a first stride of the plurality of strides to the plurality of cooperatively operating storage devices, with the first stride including substantive data and metadata including information indicating that no parity check has been performed since the substantive data was written to the plurality of cooperatively operating storage devices;
  receiving an access request to access the substantive data of the first stride;
  determining that the first stride has not been subject to a parity check since the first stride was written to the plurality of cooperatively operating storage devices based on the metadata of the first stride; and
  responsive to the access request and further responsive to the determination that the first stride has not been subject to a parity check:
    performing a parity check on the first stride to determine that the first stride has been stored correctly,
    responsive to the determination that the substantive data of the first stride has been stored correctly and further responsive to the receipt of the access request, providing access to the substantive data of the first stride, and
    changing the metadata of the first stride to indicate that a parity check has been performed on the first stride.

16. The CIM of claim 15 wherein the metadata is in the form of a set of bit(s) included within a stride scan bitmap.

17. The CIM of claim 15 the metadata indicates whether a parity check has been performed by a bit corresponding to the first stride in a stride scan bitmap.

18. The CIM of claim 17 wherein:
  a first value of the bit indicates that a parity check has not been done; and
  a second value of the bit indicates that a parity check has been done.

* * * * *